Sept. 8, 1936.  H. F. UMSTOTT  2,053,451
GLASS COFFEE MAKER
Filed Sept. 23, 1933
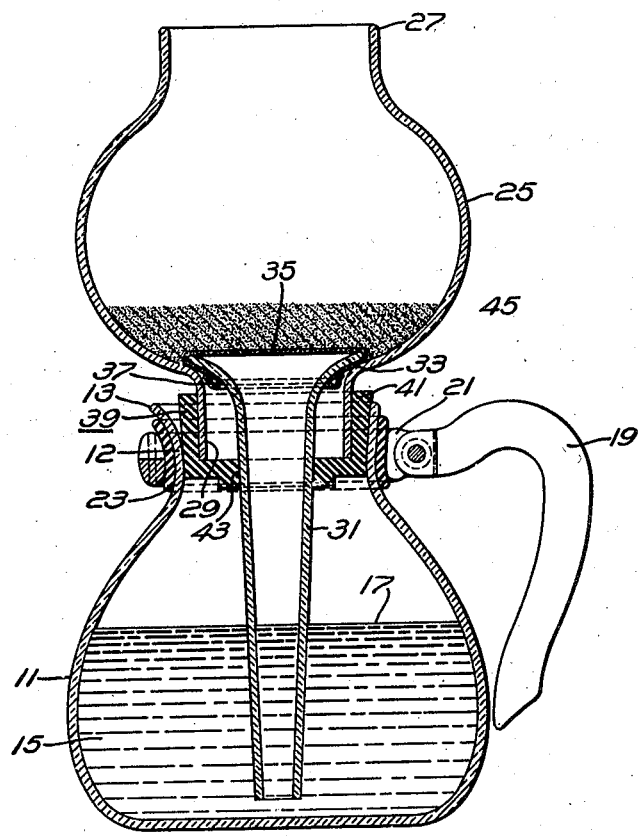
WITNESSES:
INVENTOR
Harold F. Umstott.
BY
ATTORNEY Patented Sept. 8, 1936

2,053,451

UNITED STATES PATENT OFFICE 2,053,451

GLASS COFFEE MAKER

Harold F. Umstott, Mansfield, Ohio, assignor to Westinghouse Electric & Manufacturing Company, East Pittsburgh, Pa., a corporation of Pennsylvania Application September 23, 1933, Serial No. 690,679

4 Claims. (Cl. 53—3)

My invention relates to devices for making infusions and particularly to glass coffee makers.

An object of my invention is to provide a coffee maker embodying relatively few non-metallic parts that may be easily and quickly assembled for use and as easily and quickly disassembled.

Another object of my invention is to provide a coffee maker of the type in which the hot water comes in contact with the ground coffee for a limited time only, in which the water or the infusion shall not touch any other than a glass surface, or the like.

Another object of my invention is to provide a glass coffee maker assembly that shall use a single resilient member to hold all of the parts in proper operative positions relatively to each other.

Other objects will either be apparent from the description of a preferred form of device embodying my invention or will be pointed out hereinafter.

In practicing my invention, I provide an open top lower bowl, an open top and bottom upper bowl and a funnel having a flared upper end, as well as a single resilient member for holding all of the parts in proper operative positions relatively to each other.

The single figure of the accompanying drawing is a view mainly in vertical section through a preferred form of device embodying my invention.

My improved coffee maker is of the type sometimes called Silex and the parts thereof with which the water comes in contact are preferably, although not necessarily, made of glass. Any part or element of such a coffee-making device which is non-metallic and which may be engaged by the water may cause a contamination of the infusion and, hence the design and construction of my improved coffee maker is such as to avoid such effect.

A lower bowl of glass, or the like, 11 is provided with an upper end portion 12 of reduced diameter and which has a pouring lip 13 and which is further adapted to contain the initially cold water indicated by reference character 15 in the drawing, the liquid level being indicated by reference character 17.

A handle 19 is provided for the lower bowl 11 and is so designed and constructed as to have a clamping portion or annulus 21, which may comprise two parts pivoted to each other and which surrounds the upper neck of the bowl 11, heat-insulating material 23 being provided between the clamping link 21 and the glass bowl in order to reduce the temperature rise of the handle proper. While I have illustrated and described a specific embodiment of a handle and a handle clamping structure, I do not desire to be limited thereto as this detail does not constitute any part of my invention.

An upper bowl 25 of glass, or the like, is provided with an intermediate portion of enlarged diameter while the upper end portion 27 is of reduced diameter and the lower end portion 29 is also of reduced diameter to properly fit within the upper end portion of lower bowl 11. It is to be understood that a cover member not shown in the drawing may be located on the upper end portion 27, but this is not shown as it forms no part of my present invention.

A funnel 31 of glass, or the like, having a flared upper end portion 33 is located substantially as shown in the drawing with its flared upper end 33 resting upon the lower part of the intermediate portion of bowl 25, just above the lower end portion 29, and a filter cloth 35 is located substantially as shown around the flared upper end 33 of the funnel. This may be done by providing a filter cloth of sack shape having a draw string 37 at its open end by means of which the filter cloth is stretched around the flared end of the funnel substantially as shown in the drawing. The filter cloth thus provides a substantially fluid tight gasket between the flared upper end of the funnel and the bowl 25.

A single resilient member here shown as a perforated rubber member or gasket 39 of substantially preferably cup shape fits tightly within the upper end portion 12 of the lower bowl 11 and holds all of the parts in proper operative positions relatively to each other. The outer surface of the lower part 29 of the upper bowl is preferably slightly roughened, as by being sand blasted, and the annular portion 41 of member 39 fits tightly around the outside of part 29 of the upper bowl. The opening 43 in the base or flat axial part of member 39 is of such dimension as to tightly fit around the body portion of funnel 31 when the funnel is in substantially the position shown in the drawing.

To assemble the structure whenever the same has been disassembled in order to remove coffee grounds 45 from the upper bowl, the funnel 31, together with the filter cloth 35 located across the upper open end of the funnel, are placed in the upper bowl 25 in substantially the position shown, the resilient cup shaped member 39 being preferably initially placed around the lower end 29 of the upper bowl 25. In order that the funnel may be held tightly in its proper operative position within the bowl 25 and depending therefrom, the operator may grasp the depending part of the funnel and push upwardly, that is, in a direction toward the bowl 25 on the intermediate part of member 39, whereby such intermediate part and particularly the walls of opening 43 will tightly grip the body of the funnel to make a water tight joint and will at the same time tend to pull the funnel downwardly so as to make the desired water tight joint with lower end of the bowl 25.

The bowl 25, funnel 31 and resilient member 39 may now be located in their proper operative positions within the upper end of bowl 11, it being only necessary to press downwardly on the bowl 25 with sufficient pressure to ensure the desired steam tight joint therebetween.

When a coffee maker of this type is placed upon a suitable heater which may be either an electric heating element or a gas flame, the water 15 will be heated, and steam will be generated above the fluid level 17, which will result finally in the generation of sufficient steam pressure to force substantially all of the water in bowl 11 upwardly through the funnel 31 and into engagement with and through the coffee grounds 45. The amount of water forced upwardly is, of course, determined by the position of the lower end of funnel 31. Upon removing the coffee maker from the source of heat, the steam in the lower bowl 11 will condense and the infusion until then located in the upper bowl 25 and held there by the steam pressure in bowl 11 will return to the lower bowl. After this action, the upper bowl, the funnel and the resilient member 39 may be removed from the lower bowl which may then be used to pour the coffee as may be desired and it is, of course, obvious that the lower bowl, together with any infusion remaining therein, may be reheated in any usual way if desired.

As has already been stated, the wall of member 39 defining the opening 43 will be in tight resilient engagement with the body of funnel 31, whereby a substantially water tight joint is obtained. Therefore, if because of irregularities in the thickness of the filter cloth around the outside of the flared end 33, the joint between the funnel and the upper bowl 25 should not be fluid tight, and water should enter the space within the lower end portion 29 and the closed resilient member 39, such fluid would be unable to find its way downwardly along the body of the funnel 31, so that any water which might have come into contact with a rubber gasket will not be mixed with the infusion to contaminate the same. This action has been found to be actually the case in a sample which I have made and tested.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A glass coffee maker comprising an open top lower glass bowl, an open top and bottom upper glass bowl interfitting with the lower bowl, a glass funnel having a flared upper end located in the upper bowl, a filter cloth surrounding the flared upper end of the funnel, and a single resilient member of cup-shape holding the upper bowl, the lower bowl and the funnel in proper operative positions relatively to each other, the annular portion of said member acting as a compression gasket between the two bowls.

2. A glass coffee maker comprising an open top lower glass bowl, an open top and bottom upper glass bowl interfitting with the lower bowl, a glass funnel having a flared upper end located in the upper bowl, a filter cloth surrounding the flared upper end of the funnel, and a single resilient member holding the upper bowl, the lower bowl and the funnel in proper operative positions relatively to each other, said member having an annular portion acting as a compression gasket between the two bowls, and having also a flange portion engaging the funnel to force it in a direction to hold the flared upper end of the funnel against the upper bowl.

3. A glass coffee maker including an open top lower bowl, an open top and bottom upper bowl having a lower end portion of reduced diameter to fit within the open top of the lower bowl, a funnel having a flaring top fitting within the upper bowl and extending downwardly therethrough and into the lower bowl, and a resilient gasket, of perforated cup shape, having its annular portion located between the interfitting upper and lower bowls and its perforated base portion surrounding and gripping the stem of the funnel.

4. A glass coffee maker including a lower open top bowl for receiving the infusion, an upper bowl having an open bottom portion of reduced diameter located in the upper end of the lower bowl, a funnel having a flared upper end resting on the reduced diameter portion of the upper bowl and extending downwardly therethrough and into the lower bowl, a filter cloth covering the flared upper end of the funnel and extending therearound into engagement with the inner surface of the bottom portion of reduced diameter of the upper bowl and a resilient member, of centrally-perforated cup-shape, having an annular portion located between the interfitting upper and lower bowls to provide a tight joint therebetween and its perforated central portion closely surrounding and gripping the stem of the funnel to prevent water flowing downwardly past the filter cloth and contacting the resilient member from entering the lower bowl.

HAROLD F. UMSTOTT.